US006144939A

United States Patent [19]

Pearson et al.

[11] Patent Number: 6,144,939

[45] Date of Patent: Nov. 7, 2000

[54] FORMANT-BASED SPEECH SYNTHESIZER EMPLOYING DEMI-SYLLABLE CONCATENATION WITH INDEPENDENT CROSS FADE IN THE FILTER PARAMETER AND SOURCE DOMAINS

[75] Inventors: Steve Pearson, Santa Barbara; Nicholas Kibre, Lompoc; Nancy Niedzielski, Santa Barbara, all of Calif.

[73] Assignee: Matsushita Electric Industrial Co., Ltd., Osaka, Japan

[21] Appl. No.: 09/200,327

[22] Filed: Nov. 25, 1998

[51] Int. Cl.[7] .............................. G06F 15/00; G10L 13/00

[52] U.S. Cl. .......................... 704/258; 704/265; 704/200; 704/262; 704/267; 704/268

[58] Field of Search ..................................... 704/200, 258, 704/262, 259, 265, 267; 84/600, 51

[56] References Cited

U.S. PATENT DOCUMENTS

| | | | |
|---|---|---|---|
| 4,912,768 | 3/1990 | Benbassat | 704/260 |
| 5,536,902 | 7/1996 | Serra et al. | 84/623 |
| 5,729,694 | 3/1998 | Holzrichter et al. | 704/270 |
| 5,845,247 | 12/1999 | Holzrichter | 704/205 |
| 5,970,453 | 10/1999 | Sharman | 704/260 |

OTHER PUBLICATIONS

"Spectral Modeling Synthesis: A Sound Analysis/Synthesis System Based on a Deterministic plus Stochastic Decomposition", Xavier Serra and Julius Smith III, Computer Music Journal, vol. 14, No. 4, p. 12, Winter 1990.

"Text To Speech Synthesizer Using Superposition of Sinusoidal Waves Generated By Synchronized Oscillators", K. Shirai, K. Hashimoto and T. Kobayashi, Department of Electrical Engineering, Waseda University, Japan, p. 39, Eurospeech 1991.

"High–Quality Speech Synthesis Using Context–Dependent Syllabic Units", Takashi Saito, Yasuhide Hashimoto, and Masaharu Sakamoto, IBM Research, Tokyo Research Laboratory, IBM Japan, Ltd., Japan, p. 381, IEEE 1996.

"Combining Concatenation and Formant Synthesis for Improved Intelligibility and Naturalness in Text–to–Speech Systems", Steve Pearson, Frode Holm and Kazue Hata, International Journal Of Speech Technology 1, p. 103, 1997.

"Residual–Based Speech Modification Algorithms for Text–to–Speech Synthesis", M. Edgington and A. Lowry, BT Laboratories, Martlesham Heath, U.K., p. 1425.

"Speech Synthesis", M. Stella, p. 435.

"A New Text–To–Speech Synthesis System", E. Lewis, University of Bristol, U. K., and M. A. A. Tatham, University of Essex, U. K., Eurospeech, p. 1235.

"Diphone Synthesis Using Unit Selection", Mark Beutnagel, Alistair Conkie, and Ann K. Syrdal, AT&T Labs–Research, New Jersey.

"A Diphone Synthesis System Based On Time–Domain Prosodic Modifications Of Speech", Christian Hamon, Eric Moulines, and Francis Charpentier, Centre National d'Etudes des Telecommunications, France, S5.7, p. 238.

(List continued on next page.)

*Primary Examiner*—Tālivaldis I. Šmits
*Assistant Examiner*—Daniel A. Nolan
*Attorney, Agent, or Firm*—Harness, Dickey & Pierce, P.L.C.

[57] ABSTRACT

The concatenative speech synthesizer employs demi-syllable subword units to generate speech. The synthesizer is based on a source-filter model that uses source signals that correspond closely to the human glottal source and that uses filter parameters that correspond closely to the human vocal tract. Concatenation of the demi-syllable units is facilitated by two separate cross fade techniques, one applied in the time domain to the demi-syllable source signal waveforms, and one applied in the frequency domain by interpolating the corresponding filter parameters of the concatenated demi-syllables. The dual cross fade technique results in natural sounding synthesis that avoids time-domain glitches without degrading or smearing characteristic resonances in the filter domain.

7 Claims, 7 Drawing Sheets

OTHER PUBLICATIONS

"Automatic Generation Of Synthesis Units For Trainable Text–To–Speech Systems", H. Hon, A. Acero, X. Huang, J. Liu, and M. Plumpe, Microsoft Research, Redmond, Washington.

"A New Method Of Generating Speech Synthesis Units Based On Phonological Knowledge and Clustering Technique", Yuki Yoshida, Shin'ya Nakajima, Kazuo Hakoda and Tomohisa Hirokawa, NTT Human Interface Laboratories, Japan, p. 1712.

"Automatically Clustering Similar Units For Unit Selection In Speech Synthesis", Alan W. Black and Paul Taylor, Centre for Speech Technology Research, University of Edinburgh, U. K.

Combinatorial Issues In Text–To–Speech Synthesis:, Jan P. H. van Santen, Lucent Technologies, Bell Labs, New Jersey.

"High Quality Text–To–speech Synthesis: A Comparison Of Four Candidate Algorithms", T. Dutoit, Faculte Polytechnique de Mons, Belgium.

FORMANT-BASED SPEECH SYNTHESIZER EMPLOYING DEMI-SYLLABLE CONCATENATION WITH INDEPENDENT CROSS FADE IN THE FILTER PARAMETER AND SOURCE DOMAINS

BACKGROUND AND SUMMARY OF THE INVENTION

The present invention relates generally to speech synthesis and more particularly to a concatenative synthesizer based on a source-filter model in which the source signal and filter parameters are generated by independent cross fade mechanisms.

Modern day speech synthesis involves many tradeoffs. For limited vocabulary applications, it is usually feasible to store entire words as digital samples to be concatenated into sentences for playback. Given a good prosody algorithm to place the stress on the appropriate words, these systems tend to sound quite natural, because the individual words can be accurate reproductions of actual human speech. However, for larger vocabularies it is not feasible to store complete word samples of actual human speech. Therefore, a number of speech synthesists have been experimenting with breaking speech into smaller units and concatenating those units into words, phrases and ultimately sentences.

Unfortunately, when concatenating sub-word units, speech synthesists must confront several very difficult problems. To reduce system memory requirements to something manageable, it is necessary to develop versatile sub-word units that can be used to form many different words. However, such versatile sub-word units often do not concatenate well. During playback of concatenated sub-word units, there is often a very noticeable distortion or glitch where the sub-word units are joined. Also, since the sub-word units must be modified in pitch and duration, to realize the intended prosodic pattern, most often a distortion is incurred from current techniques for making these modifications. Finally, since most speech segments are influenced strongly by neighboring segments, there is not a simple set of concatenation units (such as phonemes or diphones) which can adequately represent human speech.

A number of speech synthesists have suggested various solutions to the above concatenation problems, but so far no one has successfully solved the problem. Human speech generates complex time-varying waveforms that defy simple signal processing solutions. Our work has convinced us that a successful solution to the concatenation problems will arise only in conjunction with the discovery of a robust speech synthesis model. In addition, we will need an adequate set of concatenation units, and the further capability of modifying these units dynamically to reflect adjacent segments.

The formant-based speech synthesizer of the invention is based upon a source-filter model that closely ties the source and filter synthesizer components to physical structures within the human vocal tract. Specifically, the source model is based on a best estimate of the source signal produced at the glottis, and the filter model is based on the resonant (formant-producing) structures generally above the glottis. For this reason, we call our synthesis technique "formant-based" synthesis. We believe that modeling the source and filter components as closely as possible to actual speech production mechanisms produces far more natural sounding synthesis that other existing techniques.

Our synthesis technique involves identifying and extracting the formants from an actual speech signal (labeled to identify approximate demi-syllable areas) and then using this information to construct demi-syllable segments each represented by a set of filter parameters and a source signal waveform. The invention provides a novel cross fade technique to smoothly concatenate consecutive demi-syllable segments. Unlike conventional blending techniques, our system allows us to perform cross fade in the filter parameter domain while simultaneously but independently performing "cross fade" (parameter interpolation) of the source waveforms in the time domain. The filter parameters model vocal tract effects, while the source waveforms model the glottal source. The technique has the advantage of restricting prosodic modification to only the glottal source, if desired. This can reduce distortion usually associated with the conventional blending techniques.

The invention further provides a system whereby interaction between initial and final demi-syllables can be taken into account. Demi-syllables represent the presently preferred concatenation unit. Ideally, concatenation units are selected at points of least co-articulatory effect. The syllable is a natural unit for this purpose, but choosing the syllable requires a large amount of memory. For systems with limited available memory, the demi-syllable is preferred. In the preferred embodiment we take into account how the initial and final demi-syllables within a given syllable interact with each other. We further take into account how demi-syllables across word boundaries and sentence boundaries interact with each other. This interaction information is stored in a waveform database containing not only the source waveform data and filter parameter data, but also the necessary label or marker data and context data used by the system in applying formant modification rules. The system operates upon an input phoneme string by first performing unit selection, then building an acoustic string of syllable objects and then rendering those objects by performing the cross fade operations in both source signal and filter parameter domains. The resulting output are source waveforms and filter parameters that may then be used in a source-filter model to generate synthesized speech.

The result is a natural sounding speech synthesizer that can be incorporated into many different consumer products. Although the techniques can be applied to any speech coding application, the invention is well suited for use as a concatenative speech synthesizer, suitable for use in text-to-speech applications. This system is designed to work within the current memory and processor constraints found in many consumer applications. In other words, the synthesizer is designed to fit into a small memory footprint, while providing better sounding synthesis than other synthesizers of larger size.

For a more complete understanding of the invention, its objects and advantages, refer to the following specification and to the accompanying drawings.

DETAILED DESCRIPTION OF THE PREFERRED EMBODIMENT

While there have been many speech synthesis models proposed in the past, most have in common the following two component signal processing structure. Shown in FIG. 1, speech can be modeled as an initial source component 10, processed through a subsequent filter component 12.

Depending on the model, either source or filter, or both can be very simple or very complex. For example, one earlier form of speech synthesis concatenated highly complex PCM (Pulse Code Modulated) waveforms as the source, and a very simple (unity gain) filter. In the PCM synthesizer all a priori knowledge was imbedded in the source and none in the filter. By comparison, another synthesis method used a simple repeating pulse train as the source and a comparatively complex filter based on LPC (Linear Predictive Coding). Note that neither of these conventional synthesis techniques attempted to model the physical structures within the human vocal tract that are responsible for producing human speech.

The present invention employs a formant-based synthesis model that closely ties the source and filter synthesizer components to the physical structures within the human vocal tract. Specifically, the synthesizer of the present invention bases the source model on a best estimate of the source signal produced at the glottis. Similarly, the filter model is based on the resonant (formant producing) structures located generally above the glottis. For these reasons, we call our synthesis technique "formant-based".

Figure 2:
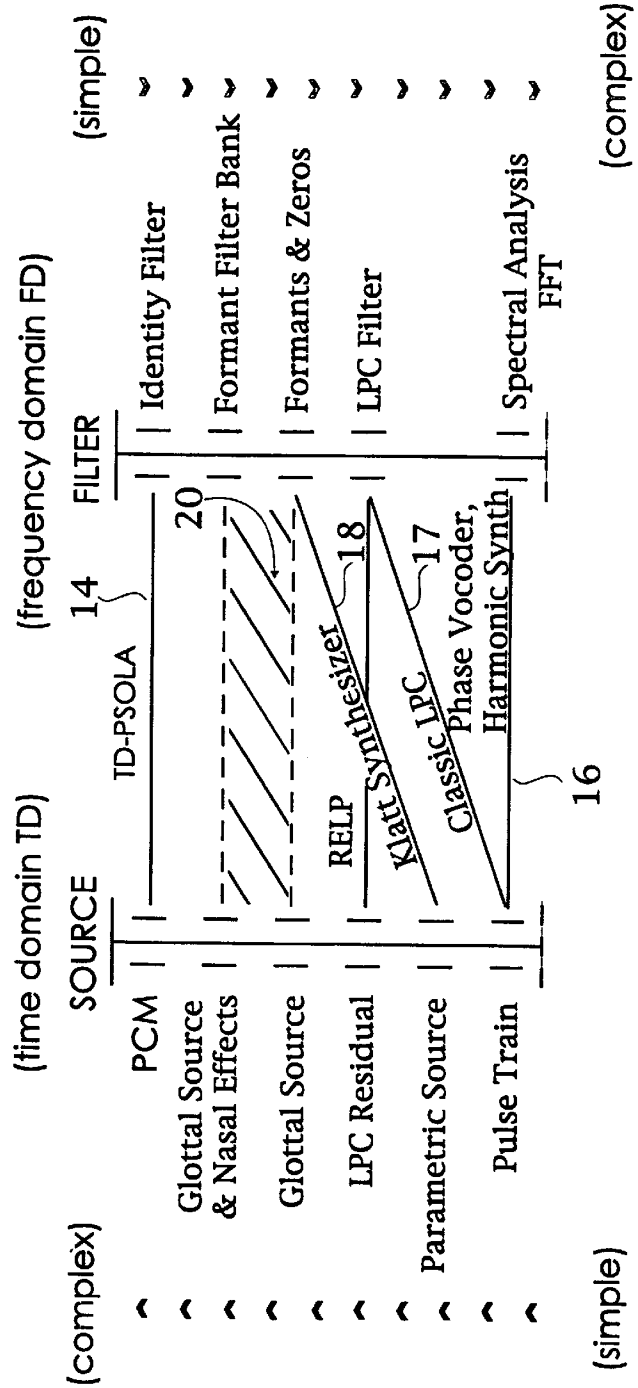
FIG. 2 is a diagram of speech synthesizer technology, illustrating the spectrum of possible source-filter combinations, particularly pointing out the domain in which the synthesizer of the present invention resides.

FIG. 2 summarizes various source-filter combinations, showing on the vertical axis a comparative measure of the complexity of the corresponding source or filter component. In FIG. 2 the source and filter components are illustrated as side-by-side vertical axes. Along the source axis relative complexity decreases from top to bottom, whereas along the filter axis relative complexity increases from top to bottom. Several generally horizontal or diagonal lines connect a point on the source axis with a point on the filter axis to represent a particular type of speech synthesizer. For example, the horizontal line 14 connects a fairly complex source with a fairly simple filter to define the TD-PSOLA synthesizer, an example of one type of well-known synthesizer technology in which a PCM source waveform is applied to an identity filter. Similarly, horizontal line 16 connects a relatively simple source with a relatively complex filter to define another known synthesizer of the phase vocorder, harmonic synthesizer. This synthesizer in essence uses a simple form of pulse train source waveform and a complex filter designed using spectral analysis techniques such as Fast Fourier Transforms (FFT). The classic LPC synthesizer is represented by diagonal line 17, which connects a pulse train source with an LPC filter. The Klatt synthesizer 18 is defined by a parametric source applied through a filter comprised of formants and zeros.

In contrast with the foregoing conventional synthesizer technology, the present invention occupies a location within FIG. 2 illustrated generally by the shaded region 20. In other words, the present invention can use a source waveform ranging from a pure glottal source to a glottal source with nasal effects present. The filter can be a simple formant filter bank or a somewhat more complex filter having formants and zeros.

To our knowledge the prior art concatenative synthesis has largely avoided region 20 in FIG. 2. Region 20 corresponds as close as practical to the natural separation in humans between the glottal voice source and the vocal tract (filter). We believe that operating in region 20 has some inherent benefits due to its central position between the two extremes of pure time domain representation (such as TD-PSOLA) and the pure frequency domain representation (such as the phase vocorder or harmonic synthesizer).

The presently preferred implementation of our formant-based synthesizer uses a technique employing a filter and an inverse filter to extract source signal and formant parameters from human speech. The extracted signals and parameters are then used in the source-filter model corresponding to region 20 in FIG. 2. The presently preferred procedure for extracting source and filter parameters from human speech is described later in this specification. The present description will focus on other aspects of the formant-based synthesizer, namely those relating to selection of concatenative units and cross fade.

The formant-based synthesizer of the invention defines concatenation units representing small pieces of digitized speech that are then concatenated together for playback through a synthesizer sound module. The cross fade techniques of the invention can be employed with concatenation units of various sizes. The syllable is a natural unit for this purpose, but where memory is limited choosing the syllable as the basic concatenation unit may be prohibitive in terms of memory requirements. Accordingly, the present implementation uses the demi-syllable as the basic concatenation unit. An important part of the formant-based synthesizer involves performing a cross fade to smoothly join adjacent demi-syllables so that the resulting syllables sound natural and without glitches or distortion. As will be more fully explained below, the present system performs this cross fade in both the time domain and the frequency domain, involving both components of the source-filter model: the source waveforms and the formant filter parameters.

The preferred embodiment stores source waveform data and filter parameter data in a waveform database. The database in its maximal form stores digitized speech waveforms and filter parameter data for at least one example of each demi-syllable found in the natural language (e.g. English). In a memory-conserving form, the database can be pruned to eliminate redundant speech waveforms. Because adjacent demi-syllables can significantly affect one another, the preferred system stores data for each different context encountered.

Figure 3:
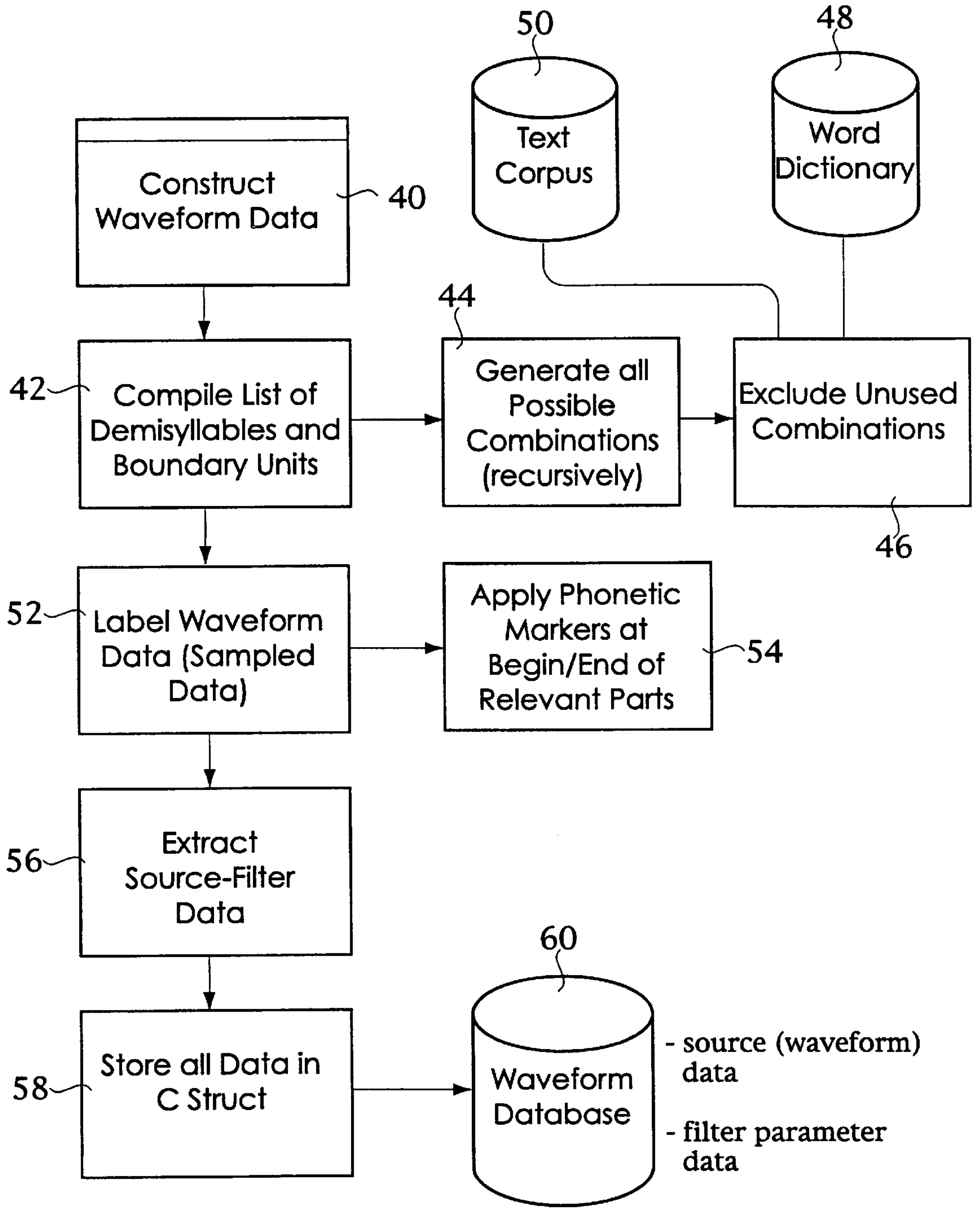
FIG. 3 is a flowchart diagram illustrating the procedure for constructing waveform databases used in the present invention.

FIG. 3 shows the presently preferred technique for constructing the waveform database. In FIG. 3 (and also in subsequent FIGS. 4A and 4B) the boxes with double-lined top edges are intended to depict major processing block headings. The single-lined boxes beneath these headings represent the individual steps or modules that comprise the major block designated by the heading block.

Referring to FIG. 3, data for the waveform database is constructed as at 40 by first compiling a list of demi-syllables and boundary sequences as depicted at step 42. This is accomplished by generating all possible combinations of demi-syllables (step 44) and by then excluding any unused combinations as at 46. Step 44 may be a recursive process whereby all different permutations of initial and final demi-syllables are generated. This exhaustive list of all possible combinations is then pruned to reduce the size of the database. Pruning is accomplished in step 46 by consulting a word dictionary 48 that contains phonetic transcriptions of all words that the synthesizer will pronounce. These phonetic transcriptions are used to weed out any demi-syllable combinations that do not occur in the words the synthesizer will pronounce.

The preferred embodiment also treats boundaries between syllables, such as those that occur across word boundaries or sentence boundaries. These boundary units (often consonant clusters) are constructed from diphones sampled from the correct context. One way to exclude unused boundary unit combinations is to provide a text corpus 50 containing exemplary sentences formed using the words found in word dictionary 48. These sentences are used to define different word boundary contexts such that boundary unit combinations not found in the text corpus may be excluded at step 46.

After the list of demi-syllables and boundary units has been assembled and pruned, the sampled waveform data associated with each demi-syllable is recorded and labeled at step 52. This entails applying phonetic markers at the beginning and ending of the relevant portion of each demi-syllable, as indicated at step 54. Essentially, the relevant parts of the sampled waveform data are extracted and labeled by associating the extracted portions with the corresponding demi-syllable or boundary unit from which the sample was derived.

The next step involves extracting source and filter data from the labeled waveform data as depicted generally at step 56. Step 56 involves a technique described more fully below in which actual human speech is processed through a filter and its inverse filter using a cost function that helps extract an inherent source signal and filter parameters from each of the labeled waveform data. The extracted source and filter data are then stored at step 58 in the waveform database 60. The maximal waveform database 60 thus contains source (waveform) data and filter parameter data for each of the labeled demi-syllables and boundary units. Once the waveform database has been constructed, the synthesizer may now be used.

Figure 4A:
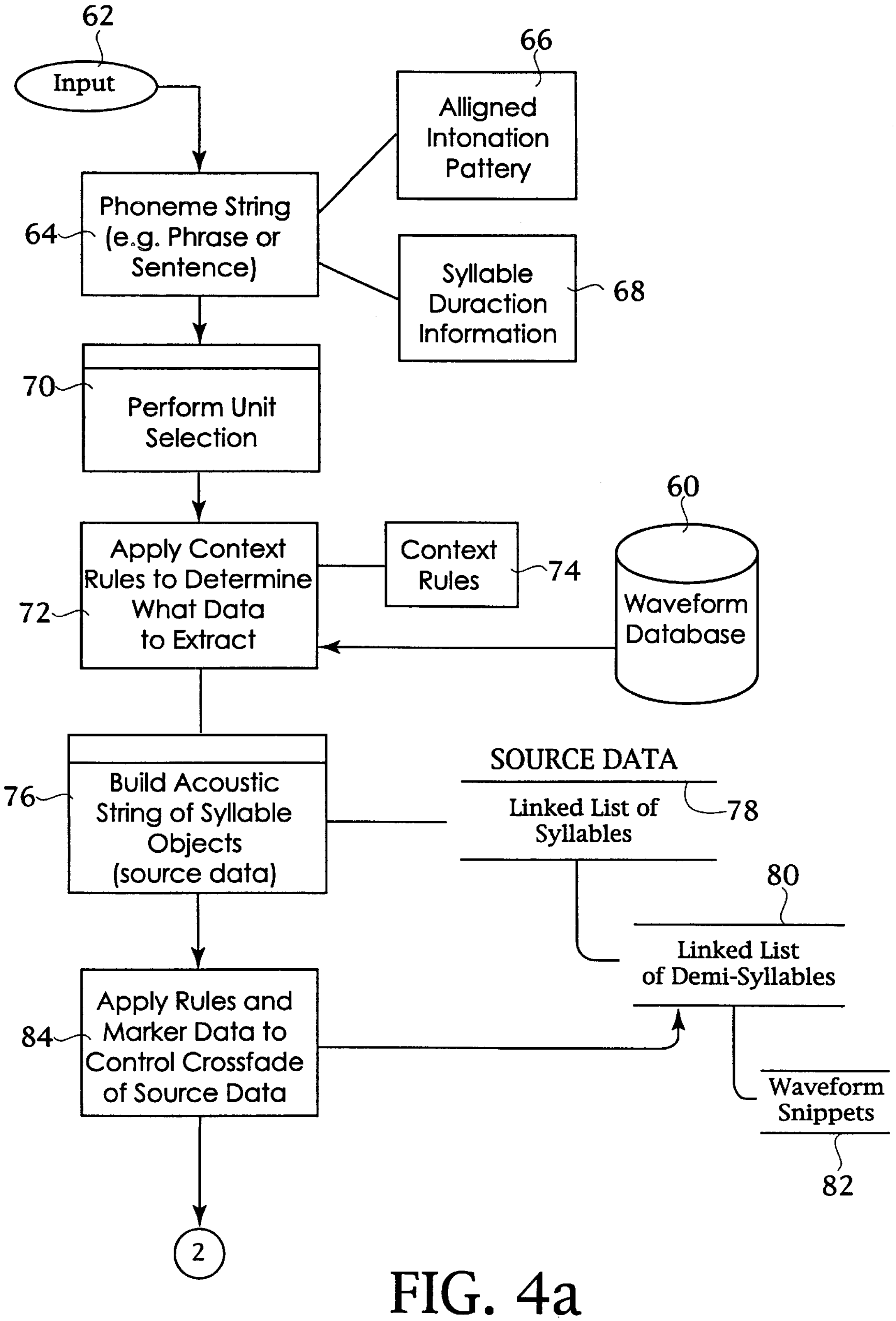
FIGS. 4A and 4B comprise a flowchart diagram illustrating the synthesis process according to the invention.

To use the synthesizer an input string is supplied as at 62 in FIG. 4A. The input string may be a phoneme string representing a phrase or sentence, as indicated diagrammatically at 64. The phoneme string may include aligned intonation patterns 66 and syllable duration information 68. The intonation patterns and duration information supply prosody information that the synthesizer may use to selectively alter the pitch and duration of syllables to give a more natural human-like inflection to the phrase or sentence.

The phoneme string is processed through a series of steps whereby information is extracted from the waveform database 60 and rendered by the cross fade mechanisms. First, unit selection is performed as indicated by the heading block 70. This entails applying context rules as at 72 to determine what data to extract from waveform database 60. The context rules, depicted diagrammatically at 74, specify which demi-syllable or boundary units to extract from the database under certain conditions. For example, if the phoneme string calls for a demi-syllable that is directly represented in the database, then that demi-syllable is selected. The context rules take into account the demi-syllables of neighboring sound units in making selections from the waveform database. If the required demi-syllable is not directly represented in the database, then the context rules will specify the closest approximation to the required demi-syllable. The context rules are designed to select the demi-syllables that will sound most natural when concatenated. Thus the context rules are based on linguistic: principles.

By way of illustration: If the required demi-syllable is preceded by a voiced bilabial stop (i.e., /b/) in the synthesized word, but the demi-syllable is not found in such a context in the database, the context rules will specify the next-most desirable context. In this case, the rules may choose a segment preceded by a different bilabial, such as /p/.

Next, the synthesizer builds an acoustic string of syllable objects corresponding to the phoneme string supplied as input. This step is indicated generally at 76 and entails constructing source data for the string of demi-syllables as specified during unit selection. This source data corresponds to the source component of the source-filter model. Filter parameters are also extracted from the database and manipulated to build the acoustic string. The details of filter parameter manipulation are discussed more fully below. The presently preferred embodiment defines the string of syllable objects as a linked list of syllables 78, which in turn, comprises a linked list of demi-syllables 80. The demi-syllables contain waveform snippets 82 obtained from waveform database 60.

Once the source data has been compiled, a series of rendering steps are performed to cross fade the source data in the time domain and independently cross fade the filter parameters in the frequency domain. The rendering steps applied in the time domain appear beginning at step 84. The rendering steps applied in the frequency domain appear beginning at step 110 (FIG. 4B).

Figure 5:
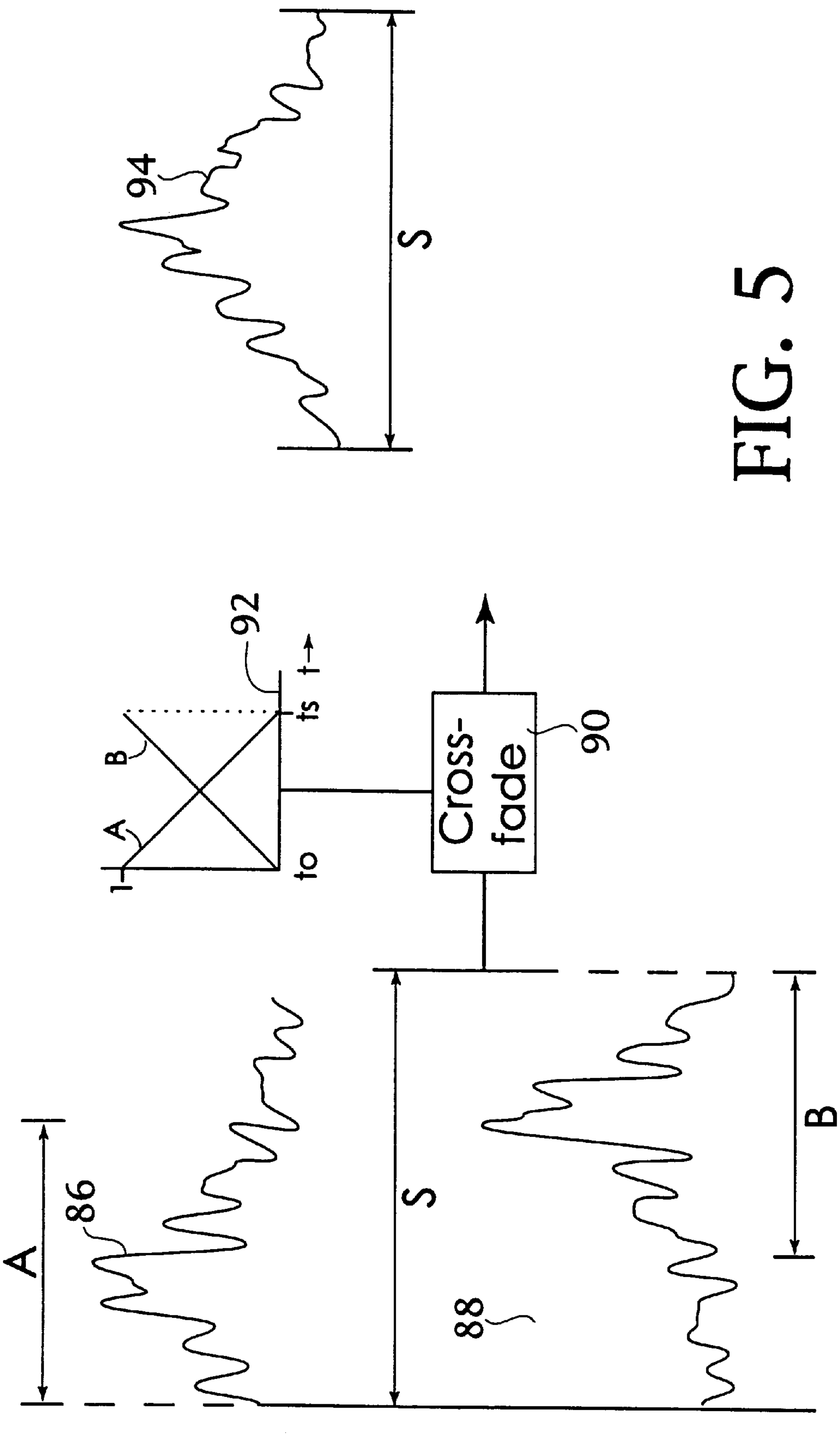
FIG. 5 is a waveform diagram illustrating time domain cross fade of source waveform snippets.

FIG. 5 illustrates the presently preferred technique for performing a cross fade of the source data in the time domain. Referring to FIG. 5, a syllable of duration S is comprised of initial and final demi-syllables of duration A and B. The waveform data of demi-syllable A appears at 86 and the waveform data of demi-syllable B appears at 88. These waveform snippets are slid into position (arranged in time) so that both demi-syllables fit within syllable duration S. Note that there is some overlap between demi-syllables A and B.

The cross fade mechanism of the preferred embodiment performs a linear cross fade in the time domain. This mechanism is illustrated diagrammatically at 90, with the linear cross fade function being represented at 92. Note that at time=$t_0$ demi-syllable A receives full emphasis while demi-syllable B receives zero emphasis. At time proceeds to $t_s$ demi-syllable A is gradually reduced in emphasis while demi-syllable B is gradually increased in emphasis. This results in a composite or cross faded waveform for the entire syllable S as illustrated at 94.

Figure 4B:
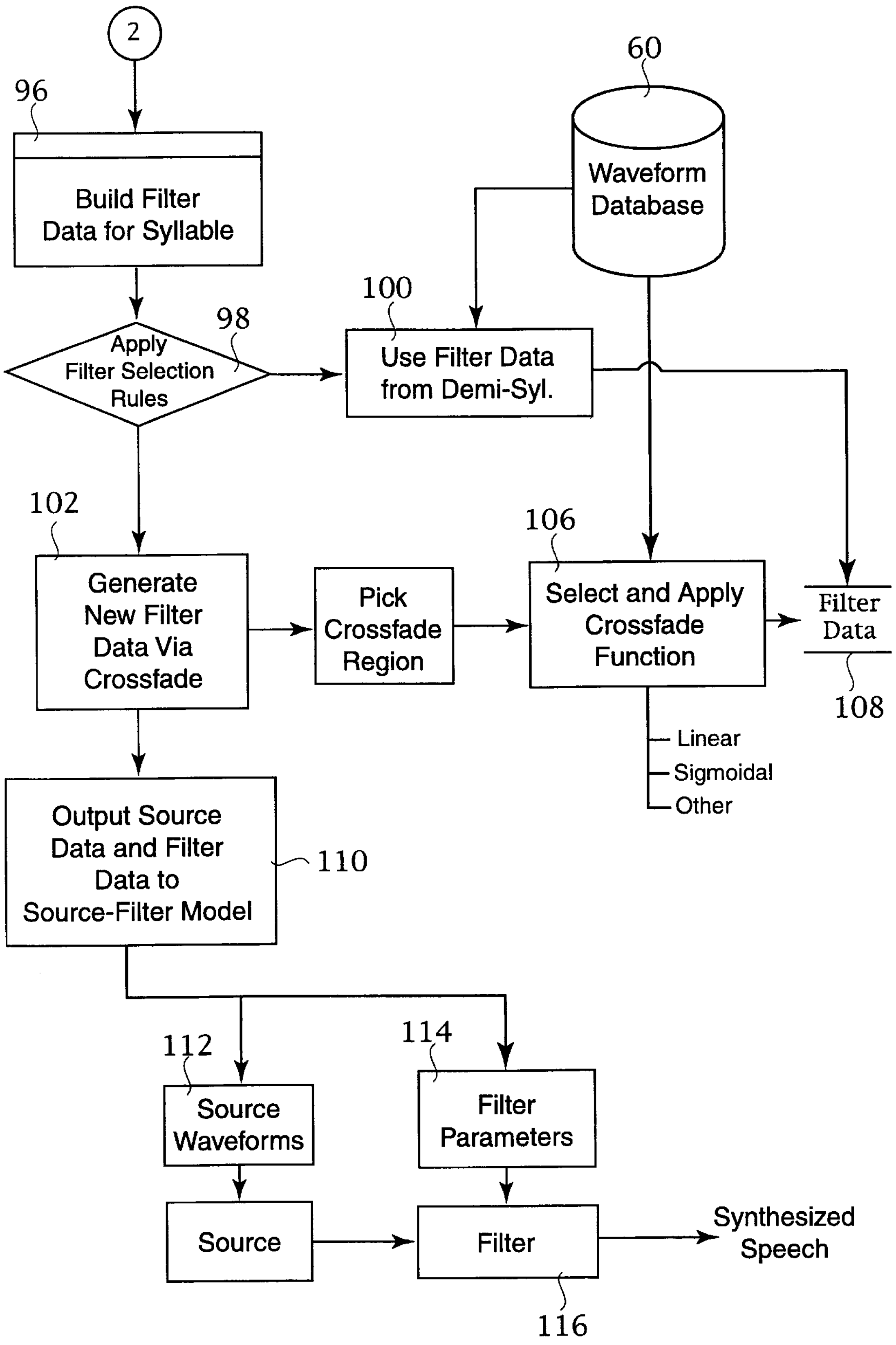

Referring now to FIG. 4B, a separate cross fade process is performed on the filter parameter data associated with the extracted demi-syllables. The procedure begins by applying filter selection rules 98 to obtain filter parameter data from database 60. If the requested syllable is directly represented in a syllable exception component of database 60, then filter data corresponding to that syllable is used as at step 100. Alternatively, if the filter data is not directly represented as a full syllable in the database, then new filter data are generated as at step 102 by applying a cross fade operation upon data from two demi-syllables in the frequency domain. The cross fade operation entails selecting a cross fade region across which the filter parameters of successive demi-syllables will be cross faded and by then applying a suitable cross fade function as at 106. The cross fade function is applied in the filter domain and may be a linear function (similar to that illustrated in FIG. 5), a sigmoidal function or some other suitable function. Whether derived from the syllable exception component of the database directly (as at set 100) or generated by the cross fade operation, the filter parameter data are stored at 108 for later use in the source-filter model synthesizer.

Selecting the appropriate cross fade region and the cross fade function is data dependent. The objective of performing cross fade in the frequency domain is to eliminate unwanted glitches or resonances without degrading important dipthongs. For this to be obtained cross-fade regions must be identified in which the trajectories of the speech units to be joined are as similar as possible. For example, in the construction of the word "house", disyllabic filter units for /haw/- and -/aws/ could be concatenated with overlap in the nuclear /a/ region.

Once the source data and filter data have been compiled and rendered according to the preceding steps, they are output as at 110 to the respective source waveform databank 112 and filter parameters databank 114 for use by the source filter model synthesizer 116 to output synthesized speech.

Source Signal and Filter Parameter Extraction

Figure 6:
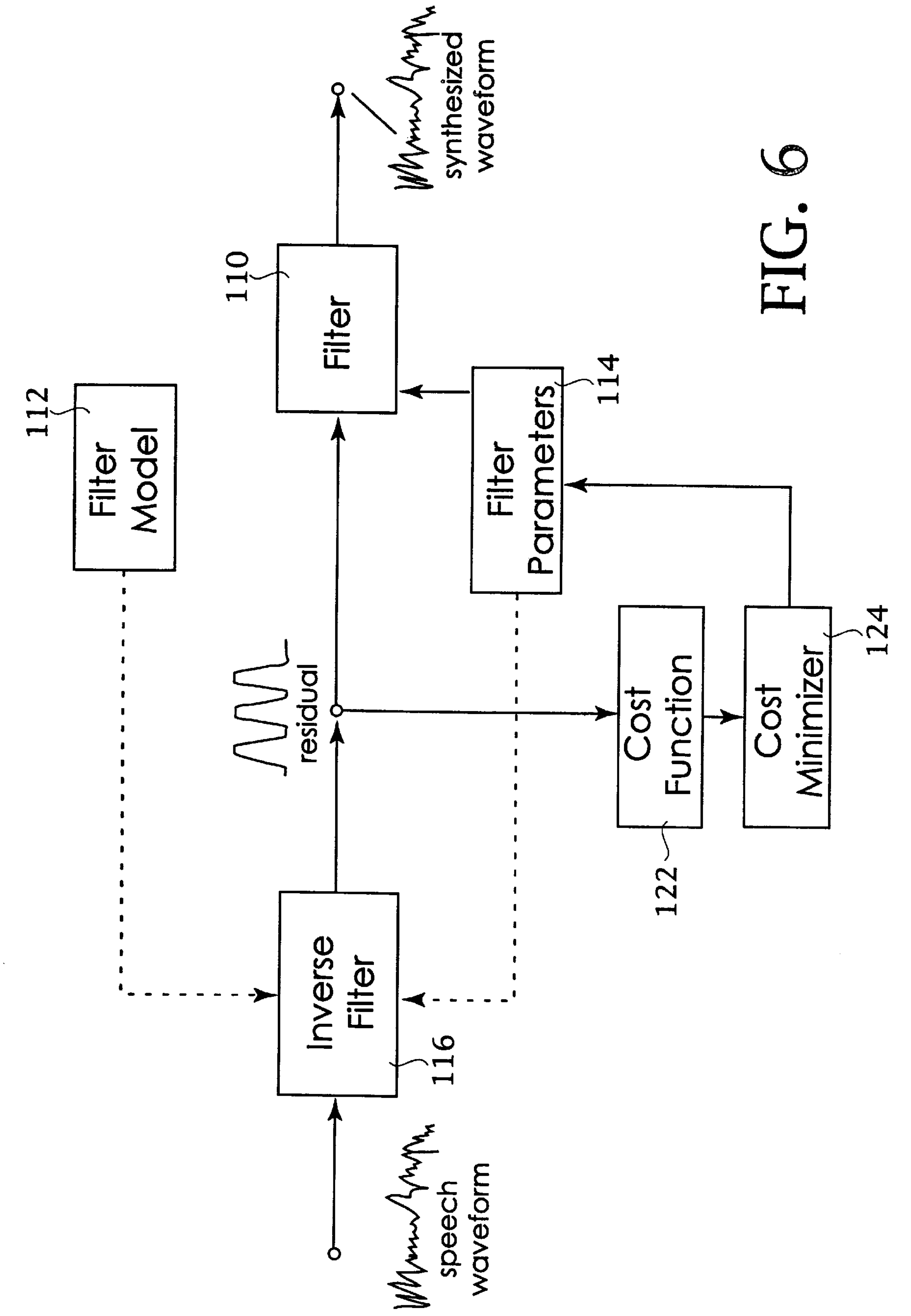
FIG. 6 is a block diagram of the presently preferred apparatus useful in practicing the invention.

FIG. 6 illustrates a system according to the invention by which the source waveform may be extracted from a complex input signal. A filter/inverse-filter pair is used in the extraction process.

In FIG. 6, filter 110 is defined by its filter model 112 and filter parameters 114. The present invention also employs an inverse filter 116 that corresponds to the inverse of filter 110. Filter 116 would, for example, have the same filter parameters as filter 110, but would substitute zeros at each location where filter 110 has poles. Thus the filter 110 and inverse filter 116 define a reciprocal system in which the effect of inverse filter 116 is negated or reversed by the effect of filter 110. Thus, as illustrated, a speech waveform input to inverse filter 16 and subsequently processed by filter 110 results in an output waveform that, in theory, is identical to the input waveform. In practice, slight variations in filter tolerance or slight differences between filters 116 and 110 would result in an output waveform that deviates somewhat from the identical match of the input waveform.

Figure 1:
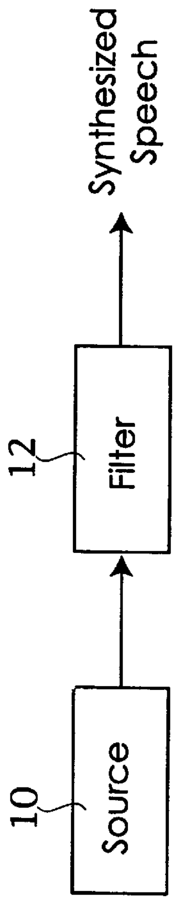
FIG. 1 (Prior Art)
FIG. 1 is a block diagram illustrating the basic source-filter model with which the invention may be employed.

When a speech waveform (or other complex waveform) is processed through inverse filter 116, the output residual signal at node 120 is processed by employing a cost function 122. Generally speaking, this cost function analyzes the residual signal according to one or more of a plurality of processing functions described more fully below, to produce a cost parameter. The cost parameter is then used in subsequent processing steps to adjust filter parameters 114 in an effort to minimize the cost parameter. In FIG. 1 the cost minimizer block 124 diagrammatically represents the process by which filter parameters are selectively adjusted to produce a resulting reduction in the cost parameter. This may be performed iteratively, using an algorithm that incrementally adjusts filter parameters while seeking the minimum cost.

Once the minimum cost is achieved, the resulting residual signal at node 120 may then be used to represent an extracted source signal for subsequent source-filter model synthesis. The filter parameters 114 that produced the minimum cost are then used as the filter parameters to define filter 110 for use in subsequent source-filter model synthesis.

Figure 7:
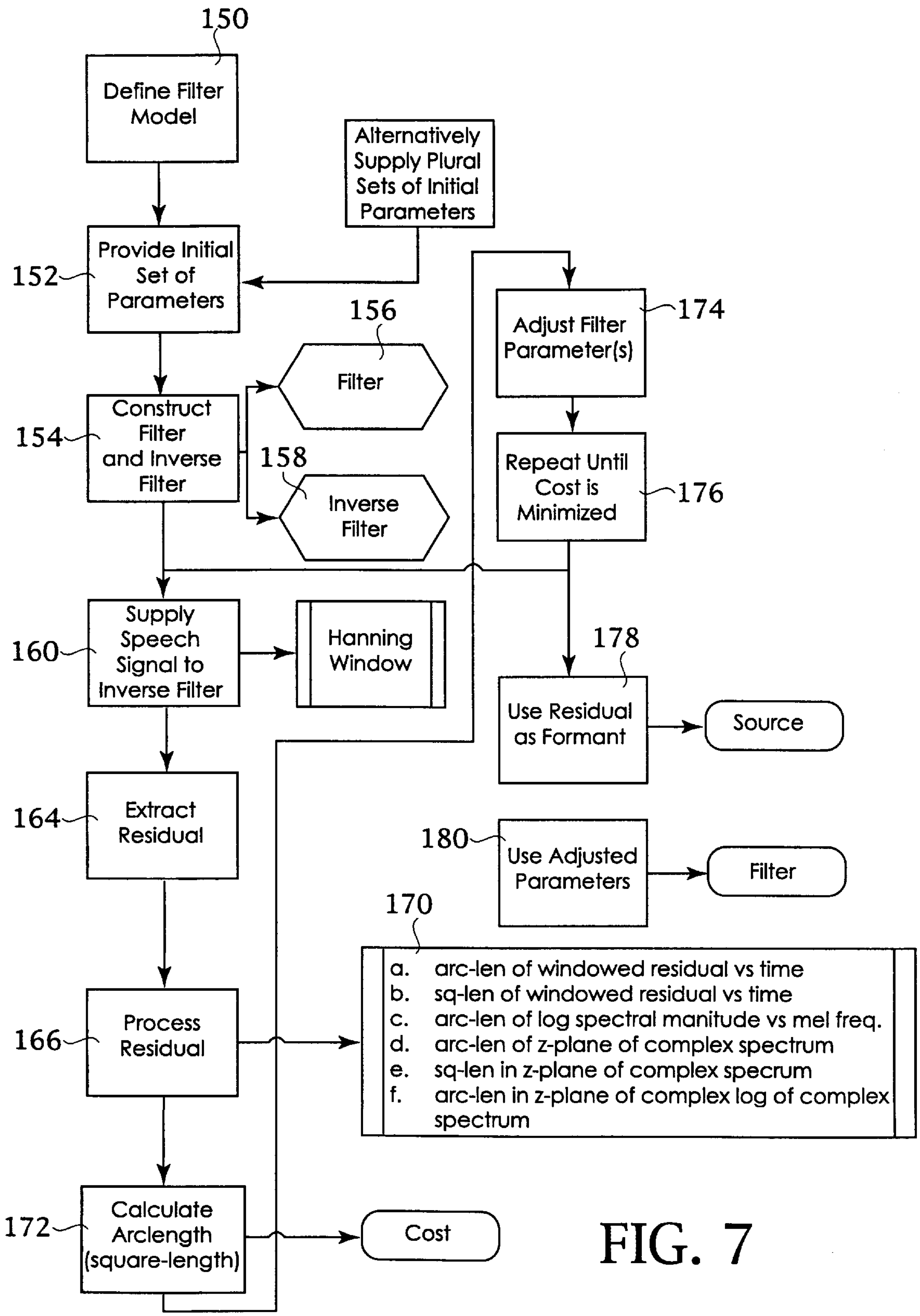
FIG. 7 is a flowchart diagram illustrating the process in accordance with the invention

FIG. 7 illustrates the process by which the source signal is extracted, and the filter parameters identified, to achieve a source-filter model synthesis system in accordance with the invention.

First a filter model is defined at step 150. Any suitable filter model that lends itself to a parameterized representation may be used. An initial set of parameters is then supplied at step 152. Note that the initial set of parameters will be iteratively altered in subsequent processing steps to seek the parameters that correspond to a minimized cost function. Different techniques may be used to avoid a sub-optimal solution corresponding to local minima. For example, the initial set of parameters used at step 152 can be selected from a set or matrix of parameters designed to supply several different starting points in order to avoid the local minima. Thus in FIG. 7 note that step 152 may be performed multiple times for different initial sets of parameters.

The filter model defined at 150 and the initial set of parameters defined at 152 are then used at step 154 to construct a filter (as at 156) and an inverse filter (as at 158).

Next, the speech signal is applied to the inverse filter at 160 to extract a residual signal as at 164. As illustrated, the preferred embodiment uses a Hanning window centered on the current pitch epoch and adjusted so that it covers two-pitch periods. Other windows are also possible. The residual signal is then processed at 166 to extract data points for use in the arc-length calculation.

The residual signal may be processed in a number of different ways to extract the data points. As illustrated at 168, the procedure may branch to one or more of a selected class of processing routines. Examples of such routines are illustrated at 170. Next the arc-length (or square-length) calculation is performed at 172. The resultant value serves as a cost parameter.

After calculating the cost parameter for the initial set of filter parameters, the filter parameters are selectively adjusted at step 174 and the procedure is iteratively repeated as depicted at 176 until a minimum cost is achieved.

Once the minimum cost is achieved, the extracted residual signal corresponding to that minimum cost is used at step 178 as the source signal. The filter parameters associated with the minimum cost are used as the filter parameters (step 180) in a source-filter model.

For further details regarding source signal and filter parameter extraction, refer to co-pending U.S. patent application, "Method and Apparatus to Extract Formant-Based Source-Filter Data for Coding and Synthesis Employing Cost Function and Inverse Filtering," Ser. No. 09/200,335, filed Nov. 25, 1998 by Steve Pearson and assigned to the assignee of the present invention.

While the invention has been described in its presently preferred embodiment, it will be understood that the invention is capable of certain modification without departing from the spirit of the invention as set forth in the appended claims.

What is claimed is:

1. A concatenative speech synthesizer, comprising:

a database containing (a) demi-syllable waveform data associated with a plurality of demi-syllables and (b) filter parameter data associated with said plurality of demi-syllables;

a unit selection system for extracting selected demi-syllable waveform data and filter parameters from said database that correspond to an input string to be synthesized;

a waveform cross fade mechanism for joining pairs of extracted demi-syllable waveform data into syllable waveform signals;

a filter parameter cross fade mechanism for defining a set of syllable-level filter data by interpolating said extracted filter parameters; and a filter module receptive of said set of syllable-level filter data and operative to process said syllable waveform signals to generate synthesized speech.

2. The synthesizer of claim 1 wherein said waveform cross fade mechanism operates in the time domain.

3. The synthesizer of claim 1 wherein said filter parameter cross fade mechanism operates in the frequency domain.

4. The synthesizer of claim 1 wherein said waveform cross fade mechanism performs a linear cross fade upon two demi-syllables over a predefined duration corresponding to a syllable.

5. The synthesizer of claim 1 wherein said filter parameter cross fade mechanism interpolates between the respective extracted filter parameters of two demi-syllables.

6. The synthesizer of claim 1 wherein said filter parameter cross fade mechanism performs linear interpolation between the respective extracted filter parameters of two demi-syllables.

7. The synthesizer of claim 1 wherein said filter parameter cross fade mechanism performs sigmoidal interpolation between the respective extracted filter parameters of two demi-syllables.

* * * * *